(12) United States Patent
Zhang et al.

(10) Patent No.: US 11,349,290 B2
(45) Date of Patent: May 31, 2022

(54) CEILING BOX ASSEMBLY

(71) Applicant: Orbit Industries Inc., Los Angeles, CA (US)

(72) Inventors: Kai Zhang, Los Angeles, CA (US); Andrew Choi, Los Angeles, CA (US); Saeed Nikayin, Los Angeles, CA (US); Gilbert Loera, Los Angeles, CA (US)

( * ) Notice: Subject to any disclaimer, the term of this patent is extended or adjusted under 35 U.S.C. 154(b) by 186 days.

(21) Appl. No.: 16/551,586

(22) Filed: Aug. 26, 2019

(65) Prior Publication Data

US 2020/0076178 A1    Mar. 5, 2020

Related U.S. Application Data

(60) Provisional application No. 62/727,495, filed on Sep. 5, 2018.

(51) Int. Cl.
*H02G 3/20* (2006.01)
*F21V 21/03* (2006.01)
*F04D 29/60* (2006.01)

(52) U.S. Cl.
CPC ............... *H02G 3/20* (2013.01); *F21V 21/03* (2013.01); *F04D 29/601* (2013.01)

(58) Field of Classification Search
CPC .. H02G 3/20; H02G 3/08; H02G 3/14; H02G 3/125; H02G 3/12; F21V 21/03; F21V 21/04; F04D 29/601; F04D 25/088; F04D 29/646; Y10S 248/906; Y10S 248/909; F16M 13/02
See application file for complete search history.

(56) References Cited

U.S. PATENT DOCUMENTS

| | | | |
|---|---|---|---|
| 1,288,024 A | 12/1918 | Kendig | |
| 1,930,928 A | 10/1933 | Dunlap, Sr. | |
| 1,982,957 A | 12/1934 | Knell | |
| 3,182,805 A | 5/1965 | Foster, Jr. et al. | |
| 4,723,747 A * | 2/1988 | Karp | F21V 21/04 248/298.1 |

(Continued)

FOREIGN PATENT DOCUMENTS

| | | | | |
|---|---|---|---|---|
| CA | 2545799 A1 * | 11/2006 | ............ | H02G 3/125 |
| CA | 2619115 C * | 1/2012 | ............ | H02G 3/125 |

(Continued)

OTHER PUBLICATIONS

Thomas & Betts 2012 wire and cable management catalog, pages A1 to A69 (Year: 2012).*

(Continued)

*Primary Examiner* — Terrell L McKinnon
*Assistant Examiner* — Ding Y Tan
(74) *Attorney, Agent, or Firm* — Kirk A. Buhler; Buhler & Associates

(57) ABSTRACT

Improvements in an electrical ceiling box and adjustable mounting brace assembly is disclosed. The assembly is for securing an electrical fixture to a ceiling. The adjustable mounting brace includes sliding bars, a slider and end flanges. The ceiling box can be mounted onto the slider within the sliding bars. A plurality of screw holes in the slider allows installers to use screws of different sizes to affix the electrical fixture to the slider and the electrical box by sliding the ceiling box to change its position on the mounting brace.

15 Claims, 3 Drawing Sheets

(56) References Cited

U.S. PATENT DOCUMENTS

| | | | |
|---|---|---|---|
| 4,757,967 A | 7/1988 | Delmore | |
| 4,967,990 A | 11/1990 | Rinderer | |
| 5,114,105 A | 5/1992 | Young | |
| 5,209,444 A | 5/1993 | Rinderer | |
| 5,303,894 A | 4/1994 | Deschamps et al. | |
| 5,333,137 A | 7/1994 | Oliva | |
| 5,516,068 A | 5/1996 | Rice | |
| 5,927,667 A | 7/1999 | Swanson | |
| 5,934,631 A * | 8/1999 | Becker | H02G 3/125 248/200.1 |
| 5,954,304 A * | 9/1999 | Jorgensen | H02G 3/125 248/200.1 |
| 6,209,836 B1 | 4/2001 | Swanson | |
| 6,389,658 B1 | 5/2002 | Pfaller et al. | |
| 6,484,980 B2 | 11/2002 | Medlin, Sr. et al. | |
| 6,485,979 B1 | 11/2002 | Medlin, Jr. | |
| 6,761,341 B2 | 7/2004 | Pfaller | |
| 6,768,071 B1 * | 7/2004 | Gretz | H02G 3/20 174/50 |
| 6,967,284 B1 * | 11/2005 | Gretz | H02G 3/125 174/50 |
| 7,073,757 B2 | 7/2006 | Johnson et al. | |
| 7,148,420 B1 * | 12/2006 | Johnson | H02G 3/125 174/58 |
| 7,355,118 B1 * | 4/2008 | Gretz | H02G 3/125 174/50 |
| 7,360,745 B2 | 4/2008 | Nikayin et al. | |
| 7,381,893 B2 * | 6/2008 | Kerr, Jr. | H02G 3/20 174/58 |
| 7,472,875 B2 | 1/2009 | Rinderer | |
| 8,403,277 B2 | 3/2013 | Nuernberger et al. | |
| 8,702,047 B2 | 4/2014 | Nuernberger et al. | |
| 8,770,526 B2 | 7/2014 | Siddiqui et al. | |
| 8,800,943 B2 | 8/2014 | Long | |
| 9,261,120 B2 | 2/2016 | Colangelo et al. | |
| 9,435,353 B1 * | 9/2016 | Gretz | F04D 29/646 |
| 9,735,557 B1 * | 8/2017 | Gretz | H02G 3/125 |
| 9,887,524 B1 * | 2/2018 | Gretz | H02G 3/14 |
| 2006/0237601 A1 | 10/2006 | Rinderer | |
| 2008/0067313 A1 * | 3/2008 | Herth | H02G 3/20 248/343 |
| 2009/0166486 A1 | 7/2009 | Sugiyama et al. | |
| 2009/0250573 A1 * | 10/2009 | Nuernberger | H02G 3/125 248/205.1 |
| 2012/0298816 A1 | 11/2012 | Siddiqui et al. | |
| 2013/0140415 A1 | 6/2013 | Nuernberger et al. | |
| 2016/0334056 A1 * | 11/2016 | Nikayin | H02G 3/126 |

FOREIGN PATENT DOCUMENTS

| | | | |
|---|---|---|---|
| FR | 3040831 A1 * | 3/2017 | H02G 3/081 |
| KR | 970006254 Y1 * | 6/1997 | |
| WO | WO-0101033 A1 * | 1/2001 | E04B 9/006 |

OTHER PUBLICATIONS

Legrand 3 3/4" Round Old Work Ceiling Box model No. C118WGAC (Year: 2013).*

* cited by examiner

CEILING BOX ASSEMBLY

CROSS REFERENCE TO RELATED APPLICATION

This application claims the benefit of Provisional Application Ser. No. 62/727,495 filed Sep. 5, 2018 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a ceiling mounted junction box. More particularly, the present junction box to accommodate different sizes and shapes of ceiling fixtures and to enable a faster installation that can support heavy lighting fixtures and ceiling fans.

Description of Related Art Including Information Disclosed Under 37 CFR 1.97 and 1.98

To install a ceiling fixture to the assembly, the installer first affixes the ceiling box to the adjustable mounting brace through the elongated screw holes on the bottom of the ceiling box. Then the installer affixes the ceiling fixture by aligning screw holes on the slider with the screw holes on the ceiling box flange and screw tabs using screws. To change from one screw size for affixing an electrical fixture to another, the installer removes the screws for the fixture, slides the electrical box to another position with a different screw hole size on the slider, and then inserts another set of screws. The elongated screw holes for the ceiling box allow for the adjustment of the position of the ceiling box while also holding the ceiling box in place.

A number of patents and/or publications have been made to address these issues. Exemplary examples of patents and/or publication that try to address this/these problem(s) are identified and discussed below.

U.S. Pat. No. 5,303,894 issued on Apr. 19, 1994 to Bernard F. Deschamps et al., and is titled Electrical Fixture Hanger. This patent discloses a two-part tubular wall or ceiling hanger mounted behind the same having means to determine the correct height from wall or ceiling and carriage bolts to fit square holes for easier assembly of the hanger plate or pan.

U.S. Pat. No. 6,768,071 issued on Jul. 27, 2004 to Thomas J. Gretz and is titled Electrical Box Mounting Assembly. This patent discloses an adjustable mounting bar and electrical box assembly for hanging a light fixture, fan, or other electrical device from a ceiling. All hardware required for mounting the electrical device is included with the assembly. The adjustable mounting bar includes sliding tubular members with end flanges for spanning between adjacent overhead joists or ceiling tiles. An electrical box is connected to the tubular members by a clamp and outer clamping fasteners, which can be loosened to adjust the length of the adjustable mounting bar. The end flanges include penetrable tabs that can be driven into the overhead joists to temporarily secure the adjustable mounting bar to the joists or ceiling tiles and thereby free the installer's hands and also allows for different screw sizes.

U.S. Pat. No. 8,800,943 issued on Aug. 12, 2014 to Min Long as is titled ventilating fan mounting bracket. This patent discloses a mounting bracket assembly for a ventilating fan including a first bracket, a second bracket, and a bracket fixing member, the first bracket is provided with a U-shaped groove and is provided at an end thereof with a first supporting leg folded into an L-shaped; the second bracket is provided with a U-shaped groove and is provided at an end thereof with a second supporting leg folded into an L-shaped, and a root portion of the second supporting leg is provided at two sides thereof with slots. This patent also does not address the use of different screw sizes.

What is needed is a ceiling mounted electrical junction box and adjustable mounting brace assembly for securing electrical fixtures requiring screws of different sizes to a ceiling. The ceiling mounted junction box disclosed in this disclosure provides the solution.

BRIEF SUMMARY OF THE INVENTION

It is an object of the ceiling box assembly is to secure electrical fixtures requiring screws of different sizes to a ceiling. The adjustable mounting brace includes two sliding bars that allow the adjustment of the length of the brace, a slider for affixing the ceiling box and the ceiling fixture to the brace, and end flanges that allow the installation of said assembly to different ceiling joist or ceiling tile thicknesses. The electrical ceiling box includes a bottom wall, a side wall, a cavity formed by said bottom wall and side wall, a screw tab with screw holes for reinforcement and a flange with screw holes which align with the screw holes in the screw tab for affixing a ceiling fixture.

It is another object of the ceiling box assembly for the ceiling box to be adjustably positioned for ceiling fixtures requiring screws of different sizes, saving effort and time. The position of the ceiling box against the slider may be changed by removing the screws and then sliding the ceiling box to a different position and using screws of a different size to affix the ceiling fixture. This invention enables cost-savings in the production of the ceiling box assembly by not requiring an additional assembly, such as a screw receiver, or additional fasteners, for achieving this feature.

It is still another object of the ceiling box assembly to securely affix an electrical fixture to a ceiling. To attach the ceiling box to the adjustable mounting brace, the installer mounts the screws for the ceiling box through the central area of the bottom wall of the ceiling box onto the slider within the adjustable mounting brace. The location for the screws on the ceiling box and the adjustable mounting brace allows for the assembly to carry more weight in a ceiling fixture than a different location for screws, such as the flange of the electrical box.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
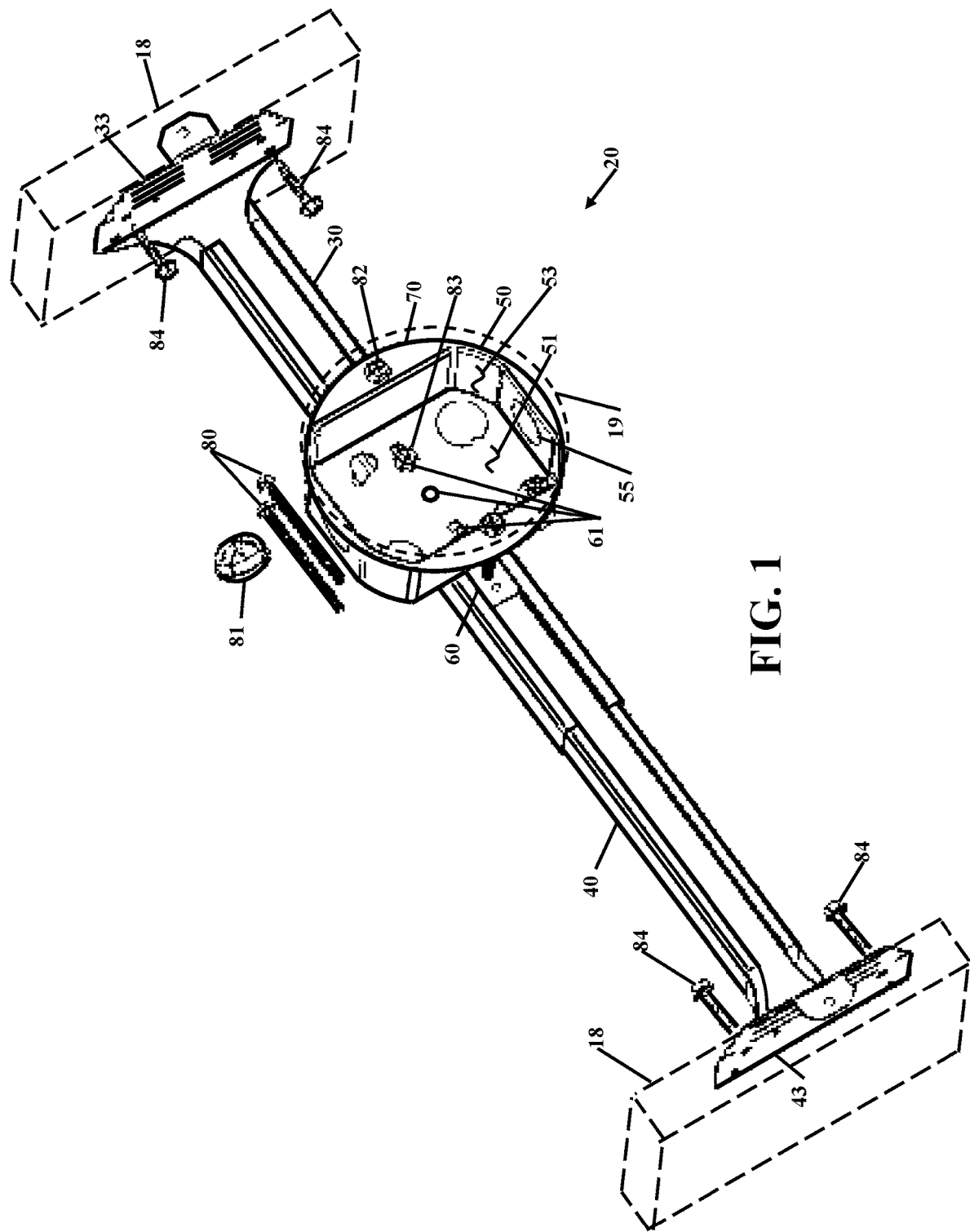
FIG. 1 shows a perspective view of the electrical box ceiling telescoping mounting assembly brace.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

Item Numbers and Description

| | |
|---|---|
| 19 ceiling fixture | |
| 20 electrical box ceiling telescoping mounting assembly brace | |
| 21 mounting bar assembly | 30 first sliding bar |
| 40 second sliding bar | 31/41 plurality of bend lines |
| 32/42 plurality of embossed screw holes | |
| 33/43 slider flanges | 44 indicia |
| 45 hammer tabs | 46 overhang tab |
| 47 overhang hole | 50 electrical box |
| 51 bottom wall | 52 bottom wall screw holes |
| 53 side wall (first end) | 54 cavity |
| 60 box slider | 61 screw holes |
| 62 box slider ends | 70 upper lip |
| 71, 72 at least two flange holes on said upper lip | |
| 80 screws | 81 wiring cap |
| 82 screws | 83 screws |
| 84 screws | |

FIG. 1 shows a perspective view of an electrical box 50 ceiling telescoping mounting assembly brace 20. The electrical box 50 provides a connection to secure a ceiling fixture 19. The ceiling fixture 19 can be a variety of types including, but not limited to a light fixture, ceiling fan fire alarm or any fixture that may or may not require an electrical connection to power. The electrical box 50 ceiling telescoping mounting assembly brace 20 provides a securing base between two joists 18 or drop ceiling hangers that are typically found in a ceiling. This allows the electrical box 50 ceiling telescoping mounting assembly brace 20 to be installed inside the ceiling behind drywall or sheetrock.

The electrical box 50 ceiling telescoping mounting assembly brace 20 has a first slider bar 30 that is shaped as a "U" with overhanging flanges. A first end of the first sliding bar 30 encloses a first end of a second sliding bar 40 to create a mounting bar assembly. The second sliding bar 40 is configured to slide or telescope within the first end of the first slider bar 30. Each slider has a plurality of screw holes 61 that enable an electrical box 50 to be secured thereon with screws 83 or the like. The screws 83 pass through the electrical box 50 and into a slider 60. The slider 60 is configured to slide within the opening in both the first slider bar 30 and the second slider bar 40. A second set of screws 82 pass through a lip 70 of the electrical box 50 and into the slider 60.

At the second end of both the first slider bar 30 and the second slider bar 40 is a slider flange 33 and a slider flange 43, respectively. Each slider flange has a plurality of bend lines (that are shown and described in greater detail in other figures) and a plurality of optional embossed screw holes that are configured to enable installation of the assembly to the ceiling joists 18. The bend line 41 enable the assembly and the slider flanges 43 to mount to different thicknesses of ceiling joists or ceiling tiles. The bend lines further enable the slider flanges to alter the height, depth or penetration of the electrical box 50 within the drywall or sheetrock surface. The flange 33 is shown with fasteners or screws 84. While some screws are shown installed or displaced from a hole, it is contemplated that the at least one second end of the first sliding bar and the second sliding bar have pre-installed screw(s) 84.

The electrical box 50 has a bottom wall 51 with a plurality of bottom wall screw holes 61 that are configured to affix the electrical box 50 to said slider 60 with fasteners such as screws 83. The electrical box 50 is formed with side wall(s) 53 that surround and are connected to the bottom wall 51. This configuration of the electrical box 50 forms a cavity with the bottom wall 51 and said side wall(s) 53. At the top of the side wall(s) 53 is an upper lip 70 that extends from a second end of the side wall(s). The upper lip 70 is formed to be parallel to the bottom wall 51 and extends outward from the cavity. The upper lip 70 has least two flange holes that are aligned with holes in the slider 60. In the configuration shown, two at least two screws 82 pass from said upper lip 70 through the at least two flange holes and into the slider 60. The screws 82 can be tightened to "bend" the slider 60 to clamp the electrical box 50 to said mounting bar assembly of the first sliding bar 30 and the second sliding bar 40.

This configuration of the electrical box 50 ceiling telescoping mounting assembly brace 20 can be sold as a kit that also includes longer (or shorter) mounting screws 80, screws for mounting the slider flanges 33 and 43 to joists 18 and a wiring cap 81 that provides insulation and a cushion for wire that is passed through knock-out holes 55 in the electrical box 50 to reduce the potential of damage to electrical wiring.

Figure 2:
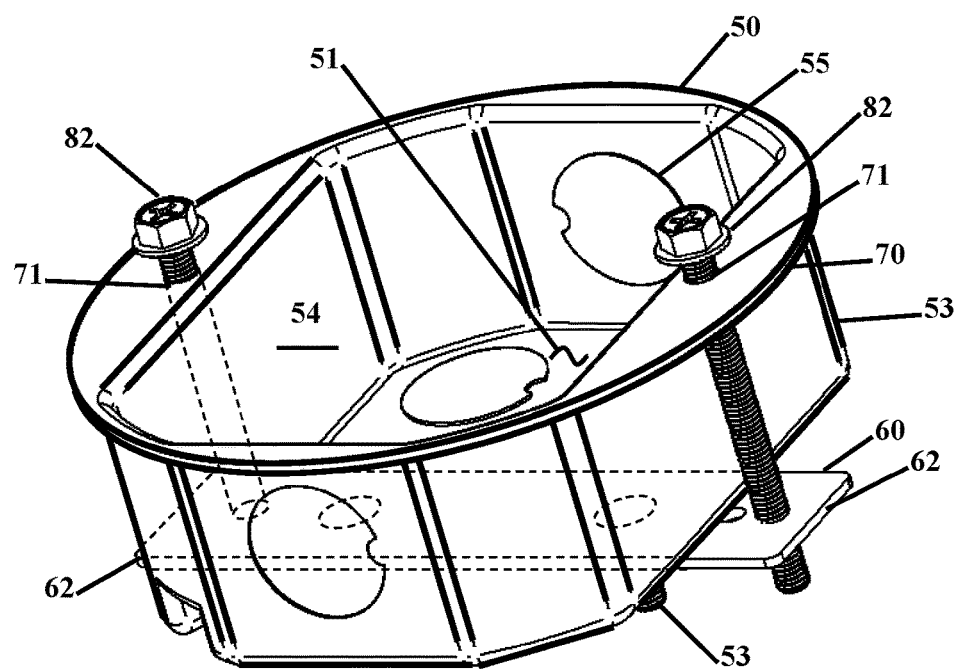
FIG. 2 shows a detailed view of the electrical box and the slider

FIG. 2 shows a detailed view of the electrical box 50 and the box slider 60. The box slider 60 exists within the first slider bar 30 and the second slider bar 40 (not shown in this figure). The electrical box 50 sits on top of the first slider bar 30 to essentially "sandwich" the box slider 60 from the underside of the bottom wall 51 of the electrical box 50. The outer ends of the box slider 60 have box slider ends 62 where the screw(s) 82 pass through flange holes 71 in the upper lip 70, along the side(s) of the electrical box 50 and into threaded holes on each box slider ends 62. While the holes 71 may be shown as round, the holes 1 can be oblong in shape to allow for accommodating manufacturing an installation variation. The side wall(s) 53 of the electrical box 50 create an open cavity 54 where the wiring of the electrical device that is connected to the electrical box 50 through one or more knock-out holes 55.

Figure 3:
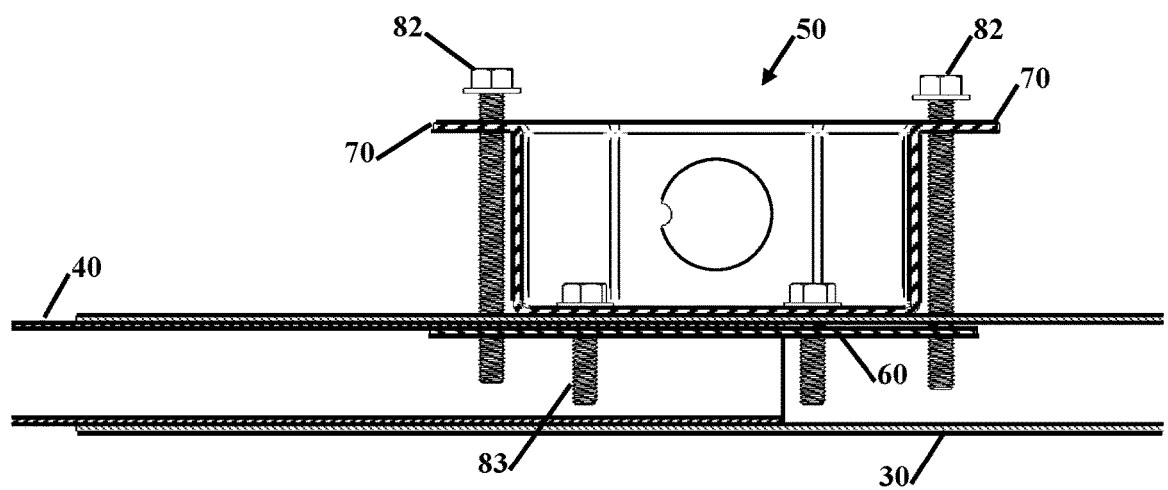
FIG. 3 shows a cross-section of the electrical box ceiling telescoping mounting assembly brace.

FIG. 3 shows a cross-section of the electrical box 50 ceiling telescoping mounting assembly brace. From this figure the slider 60 can be clearly seen within the first slider bar 30 and the second slider bar 40. In this embodiment screws 83 pass from within the electrical box 50 between an opening in both the first slider bar 30 and the second slider bar 40 and into the slider 60. A second set of screws 82 pass through the upper lip 70 of the electrical box 50, and also between an opening in both the first slider bar 30 and the second slider bar 40 and into the slider 60. In the preferred embodiment there is a plurality of holes in the slider 60 to allow for positioning of the screws 82 and 83 in different locations in the slider 60. Future figures show the plurality of screw holes. Tightening one or more of the screws 82 and/or 83 clamps the position of the electrical box 50, the first slider bar 30, the second slider bar 40 and the slider 60.

Figure 4:
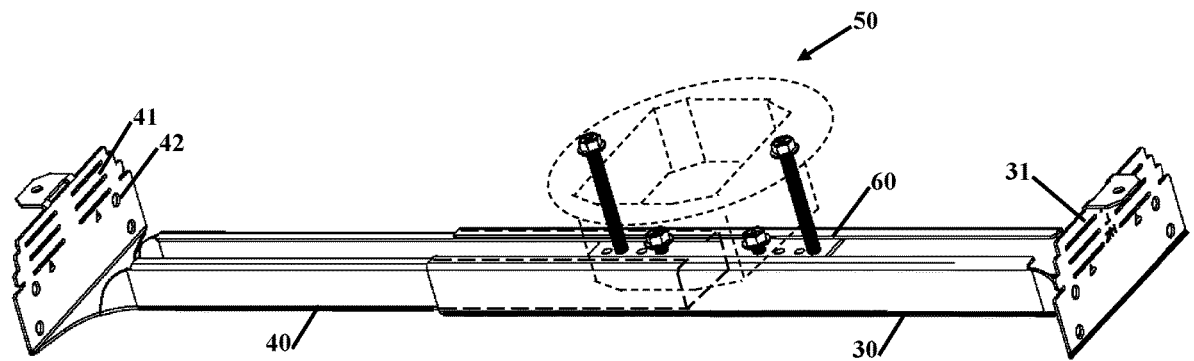
FIG. 4 shows the electrical box ceiling telescoping mounting assembly brace with the electrical box in broken lines.

FIG. 4 shows the electrical box 50 ceiling telescoping mounting assembly brace with the electrical box 50 in broken lines. This figure shows how the slider 60 passes within in the first slider bar 30 and the second slider bar 40. The multiple holes and fasteners in the slider 60 allow for connecting and securing the electrical box 50 to the slider 60 in different locations. It is also contemplated that the multiple holes allow for mounting different size or shape electrical boxes. The ends of the first slider bar 30 and the second slider bar 40 show indicia 42 (shown in other figures) and a plurality of bend lines 31 and 41. The bend lines allows an installer to more easily bend the end flanges. The indicia provide an identification for each intended bend line to assist an installer to make and use the electrical box 50 ceiling telescoping mounting assembly brace. A detailed view of the end of one flange is shown and described in one or more future figure(s).

Figure 5:
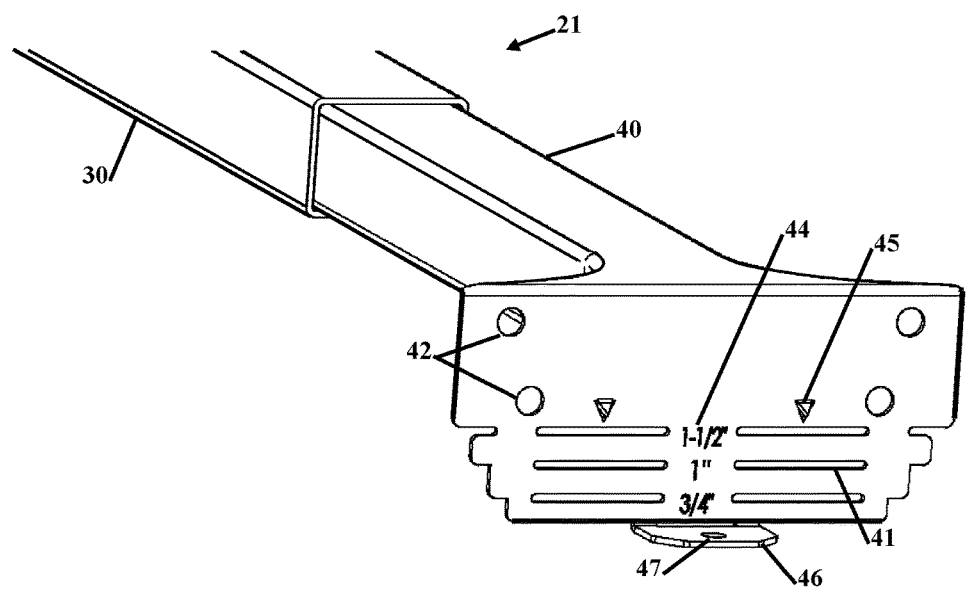
FIG. 5 shows an end view of the electrical box ceiling telescoping mounting assembly brace.

FIG. 5 shows an end view of the electrical box ceiling telescoping mounting bar assembly brace 21. The first slider bar 30 is shown with the second slider bar 40 passing into the center of the first slider bar 30. The end view of the flange of the second slider bar 40 shows a plurality of optional embossed screw holes 42 for fasteners such as nails or screws to secure the flange to a joist or ceiling tiles. The flange also shows at least one triangular hammer tabs 45 that an installer can use to temporarily hold the position of the second slider bar 40 (or first slider bar) on a joist or drop ceiling hanger. At the end of the tab is an overhang tab 46 that prevents the mounting assembly brace from sliding off of a joist or ceiling tile before the mounting assembly brace is secured. An overhang hole 47 provides an additional securing location to secure the mounting assembly brace.

In this view the indicia 44 and the bend lines 41 are more visible. The bend lines 41 are voids in the metal frame of the hanger. They provide a reduced material area to allow the brace to be bent. The indicia in this figure is for ¾", 1" and 1½" but other thicknesses or alternative thicknesses are contemplated.

Thus, specific embodiments of an electrical box ceiling telescoping mounting assembly brace have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An electrical box ceiling telescoping mounting bar assembly brace comprising:
   i. a first sliding bar having a first end that encloses a first end of a second sliding bar to create a telescoping mounting bar assembly with an open side of said telescoping mounting bar assembly;
   ii. said mounting bar assembly being configured to enable installation of said mounting bar assembly between two ceiling tiles;
   iii. an electrical box facing said open side of said telescoping mounting bar assembly and being mounted to a slider located completely within said telescoping mounting bar assembly that is configured to slide in said open side of said first sliding bar within said mounting bar assembly;
   iv. said slider having at least two inner threaded screw holes that are configured to affix screws to prevent rotation of said electrical box to said telescoping mounting bar assembly;
   v. said first sliding bar and said second sliding bar each having a second end that has a plurality of bend lines and a plurality of embossed screw holes that are configured to enable installation of said telescoping mounting bar assembly to said ceiling tiles wherein said ceiling tiles have different thicknesses;
b. said electrical box comprising:
   i. a bottom wall with a plurality of bottom wall screw holes that are configured to affix said electrical box to said slider through said open side;
   ii. a side wall that surrounds and is connected to said bottom wall on a first end;
   iii. a cavity formed by said bottom wall and said side wall;
   iv. an upper lip extending from a second end of said side wall with two outward facing flanges and said upper lip two outward facing flanges being parallel to said bottom wall and extending outward from said cavity and beyond said side wall and said cavity;
   v. a rear of said electrical box is configured to face said open side of said telescoping mounting bar assembly;
   vi. said upper lip two outward facing flanges each having at least one flange hole that are aligned with holes in said slider, and
   vii. at least two screws that pass from each of said upper lip through said at least two flange holes, through said open side of said telescoping mounting bar assembly and into threaded outer holes in said slider whereby pulling said slider within said telescoping mounting bar assembly to clamp said electrical box to said telescoping mounting bar assembly.

2. The electrical box ceiling telescoping mounting bar assembly brace according to claim 1, wherein said electrical box is configured to accept an electrical box for mounting a ceiling fixture.

3. The electrical box ceiling telescoping mounting bar assembly brace according to claim 1, wherein at least one second end of said first sliding bar and said second sliding bar have a pre-installed screw.

4. The electrical box ceiling telescoping mounting bar assembly brace according to claim 1, wherein said electrical box further includes a plurality of knockout holes that are configured for electrical wires.

5. The electrical box ceiling telescoping mounting bar assembly brace according to claim 1, further includes screws of different sizes to enable said electrical box to slide to different positions on said slider, whereby enabling alignment of the screw holes on the flange, or the screw tab or the slider.

6. The electrical box ceiling telescoping mounting bar assembly brace according to claim 1, wherein said upper lip has a plurality of hammer tabs.

7. The electrical box ceiling telescoping mounting bar assembly brace according to claim 1, wherein said plurality of bend lines include adjacent indicia.

8. The electrical box ceiling telescoping mounting bar assembly brace according to claim 7, wherein said indicia is markings of ¾", 1" and 1 ½".

9. The electrical box ceiling telescoping mounting bar assembly brace according to claim 1, wherein said plurality of bend line corresponds to a distance between a top of said electrical box and said plurality of bend lines.

10. The electrical box ceiling telescoping mounting bar assembly brace according to claim 1, wherein there are at least three bend lines.

11. The electrical box ceiling telescoping mounting bar assembly brace according to claim 1, wherein said electrical box is a light fixture, a ceiling fan, a smoke detector or a fire alarm.

12. The electrical box ceiling telescoping mounting bar assembly brace according to claim 1, wherein said first sliding bar and said second sliding bar are intersecting boxes.

13. The electrical box ceiling telescoping mounting bar assembly brace according to claim 1, wherein said electrical box with said slider are movable along said telescoping mounting bar assembly with said at least two screws passing from each of said upper lip through said at least two flange holes, through said open side and into said slider.

14. The electrical box ceiling telescoping mounting bar assembly brace according to claim 1, wherein said electrical box further includes at two holes in said bottom wall of said electrical box and said two inner threaded holes in said slide thereby allow fasteners to pull said slider into said telescoping mounting bar assembly and electrical box to clamp said electrical box to said telescoping mounting bar assembly.

15. The electrical box ceiling telescoping mounting bar assembly brace according to claim 14, wherein a location of said electrical box is moved and secured by loosening and tightening said fasteners within said electrical box.

* * * * *